(12) United States Patent
Gold (10) Patent No.: US 9,158,653 B2
(45) Date of Patent: Oct. 13, 2015

(54) DETERMINING IMPACT OF VIRTUAL STORAGE BACKUP JOBS

(75) Inventor: Stephen Gold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

(21) Appl. No.: 12/728,249

(22) Filed: Mar. 21, 2010

(65) Prior Publication Data

US 2011/0231172 A1    Sep. 22, 2011

(51) Int. Cl.
*G06F 9/44*    (2006.01)
*G06F 11/34*    (2006.01)
*G06F 11/14*    (2006.01)

(52) U.S. Cl.
CPC ........ *G06F 11/3457* (2013.01); *G06F 11/3433* (2013.01); *G06F 11/1453* (2013.01); *G06F 11/1461* (2013.01); *G06F 2201/815* (2013.01)

(58) Field of Classification Search
CPC .................................................. G06F 11/3457
USPC .......................................................... 703/21
See application file for complete search history.

(56) References Cited

U.S. PATENT DOCUMENTS

| | | | |
|---|---|---|---|
| 5,119,368 A | 6/1992 | Hiltner et al. | |
| 5,475,834 A | 12/1995 | Anglin et al. | |
| 5,600,653 A | 2/1997 | Chitre et al. | |
| 5,805,864 A | 9/1998 | Carlson et al. | |
| 5,854,754 A * | 12/1998 | Cabrera et al. | 703/2 |
| 6,519,333 B1 | 2/2003 | Malik | |
| 6,601,187 B1 | 7/2003 | Sicola et al. | |
| 6,636,778 B2 | 10/2003 | Basham et al. | |
| 6,785,786 B1 * | 8/2004 | Gold et al. | 711/162 |
| 6,842,841 B1 | 1/2005 | Kuik et al. | |
| 6,883,083 B1 | 4/2005 | Kemkar | |
| 6,888,792 B2 | 5/2005 | Gronke | |
| 6,947,981 B2 | 9/2005 | Lubbers et al. | |
| 7,089,281 B1 | 8/2006 | Kazemi et al. | |
| 7,146,476 B2 | 12/2006 | Sandorfi et al. | |
| 7,149,858 B1 | 12/2006 | Kiselev | |
| 7,383,407 B1 | 6/2008 | Kiselev | |
| 7,457,833 B2 | 11/2008 | Bear et al. | |
| 7,487,328 B2 | 2/2009 | Sakaki et al. | |

(Continued)

FOREIGN PATENT DOCUMENTS

EP    0899662  *  3/1999
JP    3265974    3/2002

OTHER PUBLICATIONS

"HP StorageWorks Virtual Library System Solutions Guide," 2007, Hewlett-Packard Development Company, pp. 1-46.*

(Continued)

*Primary Examiner* — Kamini S Shah
*Assistant Examiner* — Russ Guill
(74) *Attorney, Agent, or Firm* — Trenner Law Firm, LLC (57) ABSTRACT

Systems and methods for determining impact of a backup job on virtual storage resources are disclosed. An exemplary method includes determining an estimated performance and logical/physical capacity for the backup job on a virtual library storage (VLS). The method also includes determining an actual performance and logical/physical capacity without the backup job. The method also includes determining a simulated performance and logical/physical capacity based on the estimated and actual performance and logical/physical capacity. The method also includes comparing the simulated performance and logical/physical capacity to a threshold.

23 Claims, 3 Drawing Sheets

(56) References Cited

U.S. PATENT DOCUMENTS

| | | | |
|---|---|---|---|
| 7,506,011 | B2 | 3/2009 | Liu et al. |
| 7,536,424 | B2 | 5/2009 | Barzilai et al. |
| 7,552,358 | B1 | 6/2009 | Asgar-Deen et al. |
| 7,567,188 | B1 | 7/2009 | Anglin et al. |
| 7,613,945 | B2 | 11/2009 | Soran et al. |
| 7,689,759 | B2 | 3/2010 | Bello et al. |
| 7,756,833 | B2 | 7/2010 | Van Ingen et al. |
| 7,761,425 | B1 | 7/2010 | Erickson et al. |
| 7,941,619 | B1 | 5/2011 | Rossi |
| 8,055,622 | B1 | 11/2011 | Botes et al. |
| 2004/0139240 | A1 | 7/2004 | DiCorpo et al. |
| 2005/0010677 | A1* | 1/2005 | Krissell ............ 709/232 |
| 2005/0050055 | A1 | 3/2005 | Chang et al. |
| 2005/0081096 | A1 | 4/2005 | Gold et al. |
| 2005/0262168 | A1 | 11/2005 | Helliker et al. |
| 2006/0010174 | A1 | 1/2006 | Nguyen et al. |
| 2006/0123189 | A1* | 6/2006 | Bitner et al. ........... 711/111 |
| 2006/0224852 | A1* | 10/2006 | Kottomtharayil et al. .... 711/170 |
| 2007/0266062 | A1 | 11/2007 | Young |
| 2007/0283017 | A1 | 12/2007 | Anand et al. |
| 2007/0294206 | A1 | 12/2007 | Korman et al. |
| 2008/0162843 | A1 | 7/2008 | Davis et al. |
| 2008/0263551 | A1* | 10/2008 | Ali et al. ............ 718/102 |
| 2009/0276203 | A1* | 11/2009 | Everhart et al. ............ 703/21 |
| 2009/0282203 | A1 | 11/2009 | Haustein et al. |
| 2009/0292715 | A1* | 11/2009 | Chiaramonte et al. ....... 707/101 |
| 2009/0300633 | A1* | 12/2009 | Altrichter et al. ............ 718/103 |
| 2010/0010799 | A1* | 1/2010 | Altrichter et al. ............ 703/20 |
| 2010/0070475 | A1 | 3/2010 | Chen |
| 2010/0211949 | A1* | 8/2010 | Nakajima et al. ............ 718/100 |
| 2010/0217612 | A1* | 8/2010 | Apacible et al. ............ 705/1.1 |
| 2010/0247094 | A1* | 9/2010 | Young ............................ 398/25 |
| 2010/0280651 | A1 | 11/2010 | Edling et al. |
| 2011/0016088 | A1 | 1/2011 | Spackman |
| 2011/0231172 | A1 | 9/2011 | Gold |
| 2011/0246735 | A1 | 10/2011 | Bryant et al. |
| 2012/0078846 | A1 | 3/2012 | Gold et al. |
| 2012/0079499 | A1 | 3/2012 | Gold |
| 2012/0095968 | A1 | 4/2012 | Gold |

OTHER PUBLICATIONS

"HP Data Protector Software Advanced Backup to Disk Integration with Virtual Tape Libraries," 2008, Hewlett-Packard Development Company, pp. 1-23.*

William Stallings, "Operating systems: internals and design principles," third edition, 1998, Prentice-Hall Inc., pp. 380-383.*

"HP StorageWorks Deduplication and replication solutions guide," Apr. 2009, Hewlett-Packard Development Company, pp. 1-138.*

"VTL and PureDisk" available from http//sun.symantec.com/files/4/VTL%20and%20PureDisk_7-31_0_0.pdf, available on the Internet at least as early as Sep. 24, 2010.

Davies, Alex, "NetBackup Disk Based Data Protection Options", Symantec White Paper, available from http//eval.symantec.com/mktginfo/enterprise/white_papers/b-whitepaper_nbu_disk_based_data_protection_options_4_2_008.pdf, copyright 2007.

U.S. Appl. No. 12/889,727, Notice of Allowance mailed Nov. 15, 2014 (13 pages).

* cited by examiner

DETERMINING IMPACT OF VIRTUAL STORAGE BACKUP JOBS

BACKGROUND

Storage devices commonly implement data backup operations (e.g., backup, deduplication) using local and/or remote virtual library storage (VLS) for data recovery. Adding backup jobs places additional demand on the VLS product, and can unacceptably degrade performance and/or exceed device hardware limits. Factors that may impact performance include the additional storage capacity that will be needed for the backup job (including retained versions and working space), and available storage capacity during peak usage.

However, determining the amount of available storage capacity is complicated when using a deduplication-enabled VLS product with post processing. The deduplication process may use additional storage capacity for the post-processing, and also compress data at various times, and so the available storage capacity is variable over time. Accordingly, it can be difficult for a user to determine whether a backup job can be added to the VLS product without exceeding device hardware limits and/or unacceptably degrading performance.

DETAILED DESCRIPTION

Systems and methods are disclosed for determining impact of adding a backup job on virtual storage resources. It is noted that the term "backup" is used herein to refer to backup operations including echo-copy and other proprietary and non-proprietary data operations now known or later developed. Briefly, a storage system is disclosed including a local storage device and a remote storage device. Data (e.g., backup data for an enterprise) may be backed-up to a virtual storage library at the local storage device. The data may also be replicated by the local storage device onto another virtual storage library at the remote storage device.

Determining whether the proposed backup job will exceed the device hardware limits and/or unacceptably degrade performance of a VLS product requires consideration of the current device characteristics and usage, in addition to how the deduplication process is operating over time.

The systems and methods described herein enable a user to readily check whether adding a backup job to the VLS product will exceed a performance metrics (e.g., a threshold based on actual hardware limits and/or preferred use). In an exemplary embodiment, the systems and methods automatically determine the impact of the new or proposed backup job, based at least in part on user-input parameters defining the backup job, and based at least in part on operation parameters. The systems and methods may then report to the user whether any of the performance metrics will be exceeded by the backup job so that the user can determine whether to proceed with establishing the new backup job. In other embodiments, the systems and methods may automatically enable or prevent adding a backup job based on one or more predefined threshold for allowing or disallowing the addition of a backup job.

Accordingly, the VLS product is less likely to be overscheduled or otherwise overloaded. Although not limited to any particular usage environment, the ability to better schedule and manage backup "jobs" is particularly desirable in a service environment where a single VLS product may be shared by multiple users (e.g., different business entities), and each user can determine whether to add a backup job to the user's own virtual tape library within the VLS product.

Before continuing, it is noted that any of a wide variety of storage products may also benefit from the teachings described herein, e.g., files sharing in network-attached storage (NAS) or other backup devices. In addition, the remote virtual library (or more generally, "target") may be physically remote (e.g., in another room, another building, offsite, etc.) or simply "remote" relative to the local virtual library. It is also noted that exemplary operations described herein may be embodied as logic instructions on one or more computer-readable medium. When executed by one or more processor, the logic instructions cause a general purpose computing device to be programmed as a special-purpose machine that implements the described operations.

Figure 1:
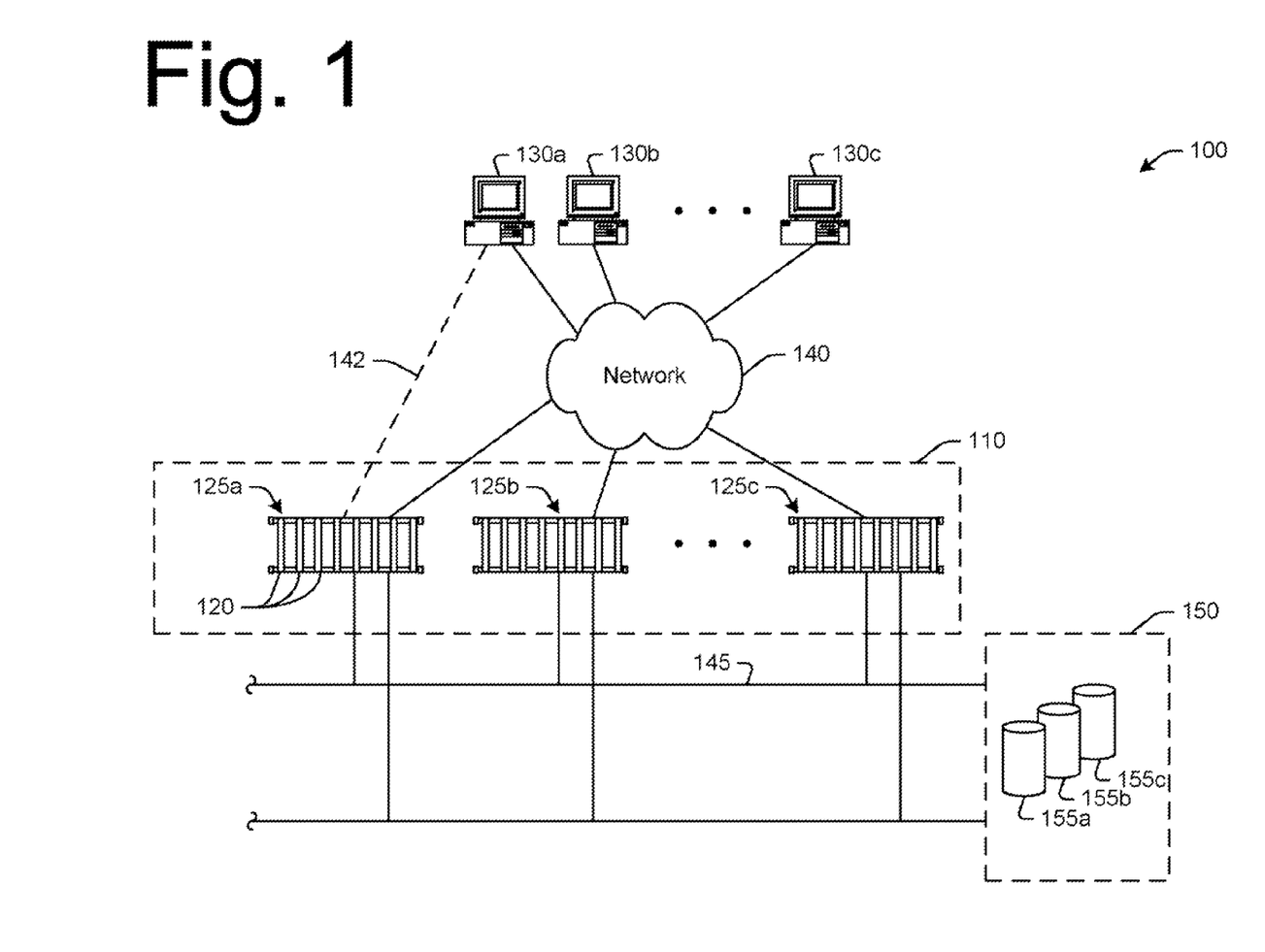
FIG. 1 is a high-level diagram showing an exemplary storage system including both local and remote storage.

FIG. 1 is a high-level diagram showing an exemplary storage system 100. Exemplary storage system may include local storage device 110 and may include one or more storage cells 120. The storage cells 120 may be logically grouped into one or more virtual library storage (VLS) 125a-c (also referred to generally as local VLS 125) which may be accessed by one or more client computing device 130a-c (also referred to as "clients"), e.g., in an enterprise. In an exemplary embodiment, the clients 130a-c may be connected to storage system 100 via a communications network 140 and/or direct connection (illustrated by dashed line 142). The communications network 140 may include one or more local area network (LAN) and/or wide area network (WAN). The storage system 100 may present virtual libraries to clients via a unified management interface (e.g., in a "backup" application).

It is also noted that the terms "client computing device" and "client" as used herein refer to a computing device through which one or more users may access the storage system 100. The computing devices may include any of a wide variety of computing systems, such as stand-alone personal desktop or laptop computers (PC), workstations, personal digital assistants (PDAs), server computers, or appliances, to name only a few examples. Each of the computing devices may include memory, storage, and a degree of data processing capability at least sufficient to manage a connection to the storage system 100 via network 140 and/or direct connection 142.

In exemplary embodiments, the data is stored on one or more local VLS 125. Each local VLS 125 may include a logical grouping of storage cells. Although the storage cells 120 may reside at different locations within the storage system 100 (e.g., on one or more appliance), each local VLS 125 appears to the client(s) 130a-c as an individual storage device. When a client 130a-c accesses the local VLS 125 (e.g., for a read/write operation), a coordinator coordinates transactions between the client 130a-c and data handlers for the virtual library.

Redundancy and recovery schemes may be utilized to safeguard against the failure of any cell(s) 120 in the storage system. In this regard, storage system 100 may communicatively couple the local storage device 110 to the remote storage device 150 (e.g., via a back-end network 145 or direct connection). As noted above, remote storage device 150 may be physically located in close proximity to the local storage device 110. Alternatively, at least a portion of the remote storage device 150 may be "off-site" or physically remote from the local storage device 110, e.g., to provide a further degree of data protection.

Remote storage device 150 may include one or more remote virtual library storage (VLS) 155a-c (also referred to generally as remote VLS 155) for replicating data stored on one or more of the storage cells 120 in the local VLS 125. Although not required, in an exemplary embodiment, deduplication may be implemented for replication.

Deduplication has become popular because as data growth soars, the cost of storing data also increases, especially backup data on disk. Deduplication reduces the cost of storing multiple backups on disk. Because virtual tape libraries are disk-based backup devices with a virtual file system and the backup process itself tends to have a great deal of repetitive data, virtual tape libraries lend themselves particularly well to data deduplication. In storage technology, deduplication generally refers to the reduction of redundant data. In the deduplication process, duplicate data is deleted, leaving only one copy of the data to be stored. Accordingly, deduplication may be used to reduce the required storage capacity because only unique data is stored. That is, where a data file is conventionally backed up X number of times, X instances of the data file are saved, multiplying the total storage space required by X times. In deduplication, however, the data file is only stored once, and each subsequent time the data file is simply referenced back to the originally saved copy.

With a virtual tape library that has deduplication, the net effect is that, over time, a given amount of disk storage capacity can hold more data than is actually sent to it. For purposes of example, a system containing 1TB of backup data which equates to 500 GB of storage with 2:1 data compression for the first normal full backup.

If 10% of the files change between backups, then a normal incremental backup would send about 10% of the size of the full backup or about 100 GB to the backup device. However, only 10% of the data actually changed in those files which equates to a 1% change in the data at a block or byte level. This means only 10 GB of block level changes or 5 GB of data stored with deduplication and 2:1 compression. Over time, the effect multiplies. When the next full backup is stored, it will not be 500 GB, the deduplicated equivalent is only 25 GB because the only block-level data changes over the week have been five times 5 GB incremental backups. A deduplication-enabled backup system provides the ability to restore from further back in time without having to go to physical tape for the data.

Regardless of whether deduplication is used, device management and data handling may be enhanced by enabling a user to determine the impact adding a backup job to a VLS product. Systems and method for determining impact on virtual storage resources may be better understood by the following discussion and with reference to FIGS. 2 and 3.

Figure 2:
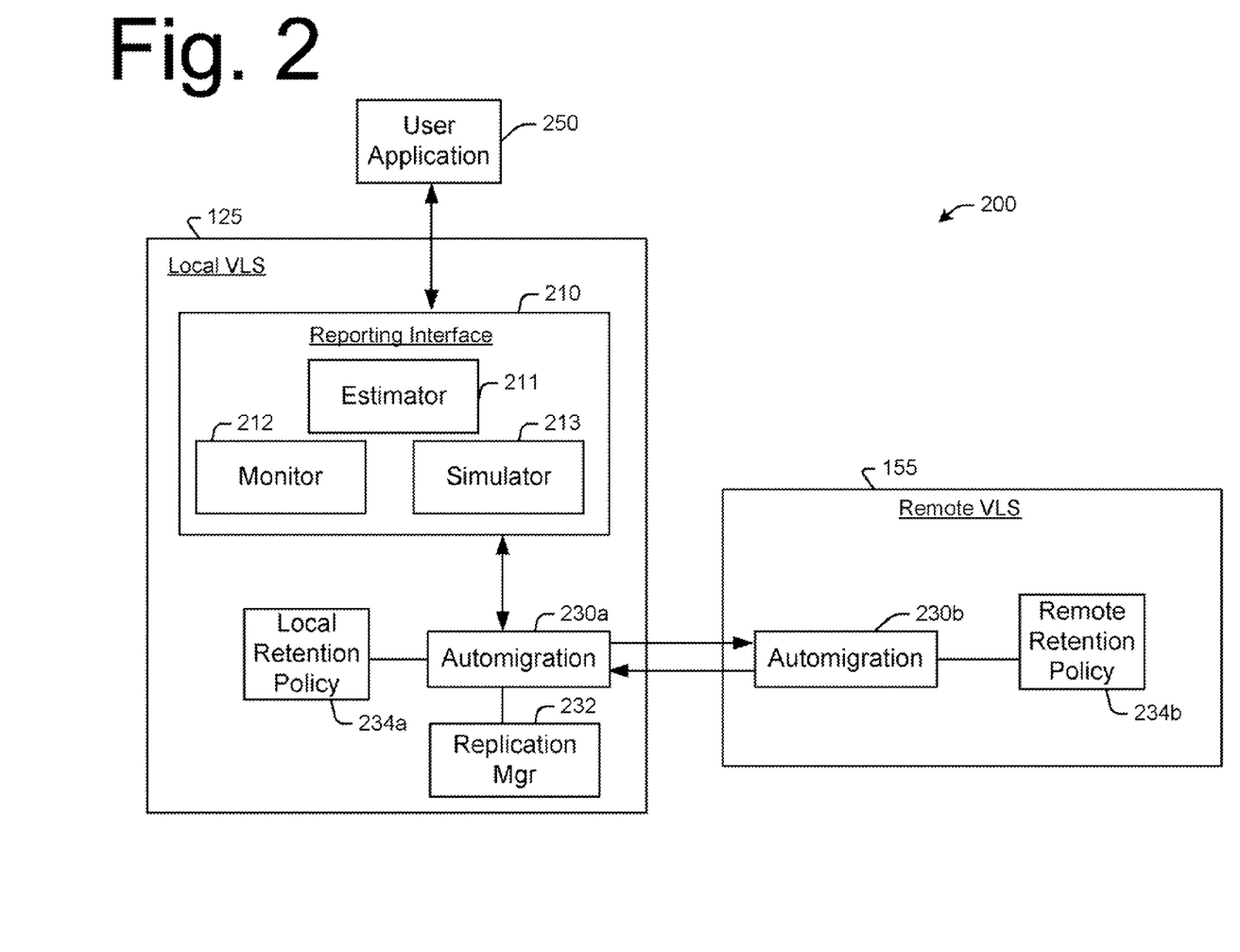
FIG. 2 shows an exemplary software architecture which may be implemented in the storage system for determining impact of a backup job on virtual storage resources.

FIG. 2 shows an exemplary software architecture 200 which may be implemented in the storage system 100 for determining impact of adding a backup job on virtual storage resources. The software architecture 200 may comprise a reporting interface 210 operatively associated with an automigration component and a user application 250. The components may be implemented in program code (e.g., firmware and/or software and/or other logic instructions) stored on one or more computer readable medium and executable by a processor to perform the operations described below. It is noted that these components are provided for purposes of illustration and are not intended to be limiting. Each of these components will now be described in more detail.

Automigration components 230a, 230b may be provided at each of the local VLS 125 and remote VLS 155. The automigration component 230a at the local VLS 125 may be communicatively coupled to the automigration component 230b at the remote VLS 155 to handle replication between the local VLS 125 and remote VLS 155.

At the local VLS 125, automigration component 230a may also include a replication manager 232. Replication manager 232 may cooperate with the automigration component 230b at the remote VLS 155 to move at least one virtual tape from the local VLS 125 to the remote VLS 155. Replication manager 232 may also be implemented as program code, and is enabled for managing replication of data between the local VLS 125 and remote VLS 155.

In order to replicate data from the local VLS 125 to the remote VLS 155, the replication manager 232 provides a software link between the local VLS 125 and the remote VLS 155. The software link enables data (e.g., copy/move jobs, setup actions, etc.) to be automatically transferred from the local VLS 125 to the remote VLS 155. In addition, the configuration, state, etc. of the remote VLS 155 may also be communicated between the automigration components 230a, 230b.

It is noted that although implemented as program code, the automigration components 230a, 230b may be operatively associated with various hardware components for establishing and maintaining a communications link between the local VLS 125 and remote VLS 155, and for communicating the data between the local VLS 125 and remote VLS 155 for replication.

It is also noted that the software link between automigration components 230a, 230b may also be integrated with deduplication technologies. In use, the user can setup replication at the local VLS 125 via the replication manager 232, and run replication jobs in a user application 250 (e.g., the "backup" application) to replicate data from the local VLS 125. While the term "backup" application is used herein, any application that supports replication operations may be implemented.

The automigration component 230a at the local VLS 125 may be operatively associated with the reporting interface 210. Reporting interface 210 may be operatively associated with the user application 250 for determining impact of adding a backup job on virtual storage resources.

In an exemplary embodiment, the user may input parameters to the user application 250. The parameters define one or more characteristics for a new backup job. These characteristics may include the job size, job retention policy 234a-b which full and/or incremental replications are retained), job window (e.g., start time and/or duration for each day of the week), and compression factor (e.g., the compression ratio and the daily change rate at the block level). These parameters are then compared by components of the reporting interface 210 to estimated performance, logical capacity, and physical capacity to determine whether sufficient resources are available to implement the new backup job.

Estimated performance is the amount of data transfer (e.g., measured in megabytes per second) needed to write the new replications to the device. The replication window(s) may vary over time (e.g., from day to day during the week), and so the estimated performance may be determined to take time variations into consideration (e.g., determined for each day of the week). This determination may be based on the size of data being backed up (full versus incremental) for each time (e.g., for each day of the week), and how much of the backup window is available for that particular time (e.g., a particular day).

For purposes of illustration, the user may set a retention policy to run a weekly 100 GB full backup and daily incremental backups which are 10% of the full backup (e.g., 10 GB each). In addition, there may be a ten hour backup window for the full backup, and a two hour backup window for each incremental backup. Accordingly, the estimator component 211 determines that an average transfer rate of 2.8 MBytes/sec is needed for the full backup (e.g., 100 GB written over 10 hours), and an average transfer rate of 1.4 MBytes/sec is needed for each incremental backup (e.g., 10 GB written over 2 hours).

Logical capacity is the total amount of backup data that will be written to the device during one retention cycle. For example, if the retention policy is to retain twenty full backup jobs on the device, and the full backup size is 10 GB then the estimator component 211 determines that the logical capacity is 20×10=200 GB.

Physical capacity depends at least in part whether deduplication is enabled or disabled. When deduplication is not enabled, physical capacity is the logical backup capacity divided by the average compression ratio (e.g., standard compression). However, when deduplication is enabled, then the estimator component 211 has to estimate physical capacity based on how much the logical data is reduced by deduplication and removing duplicate data across multiple versions of the replication. Because deduplication may be different for incremental and full backups, the estimator component 211 estimates the physical capacity based on retention rate (e.g., how many copies of incremental and full backups), number of full backups (e.g., per month), and the daily percentage change. The estimator component 211 also takes into consideration any post-processing working space. Post-processing working space may be determined as follows:

$$I_{size} = ((N \times B_{size}) + (N \times D \times S \times (T-1)))/C$$

Where:
$I_{size}$ is the incremental size;
N is the number of incrementals percent increase;
$B_{size}$ is the full backup size;
D is the percent block change;
S is the full backup size;
T is time (e.g., number of weeks to retain incrementals); and
C is the compression.

$$F_{size} = ((2.3 \times B_{size}) + (N_W \times W) - 2) \times D \times B_{size})/C$$

Where:
$F_{size}$ is the full size;
$N_W$ is the number of weekly fulls; and
W is the number of weeks to retain weekly fulls.

$$M_{size} = (N_M \times (D \times 30) \times B_{size})/C$$

Where:
$M_{size}$ is the monthly full size;
$N_M$ is the number of monthly fulls; and
W is the number of weeks to retain weekly fulls.

$$\text{Physical Capacity} = (I_{size} + F_{size} + N_M)$$

After determining the estimated performance, logical size, and physical size needed for the new backup, the reporting interface 210 compares this information with actual device activity. Accordingly, monitor component 212 may be implemented to monitor (e.g., measure and record during operation) actual performance, logical size, and physical size. In an exemplary embodiment, the monitor component 212 may record at desired intervals (e.g., regularly such as hourly) the performance, logical size, and physical size for a particular virtual tape library (VTL) which will be handling the new backup job (e.g., when multiple VTLs are configured on the same physical VLS and each VTL may have different characteristics).

It is also possible to measure the logical and physical capacity of each virtual cartridge in a VTL. Because it can be determined which virtual cartridges are currently loaded into a particular VTL, the total logical and physical capacity can be determined for each VTL. It is also possible to measure the performance of each virtual tape drive. The total performance usage of each VTL can be determined based on which virtual tape drives are used in a particular VTL.

The monitor component 212 may also determine the maximum performance of each VTL. For purposes of illustration, each front-end fiber channel (FC) port on a VLS may provide a transfer rate of approximately 300 MBytes/sec. To determine the maximum performance of a VTL, the monitor component 212 may determine which FC ports are used by the virtual tape drives in a particular VTL. If the FC port is dedicated to that particular VTL, then the entire 300 MBytes/sec transfer rate can be assigned to the VTL. But if the FC port is shared with other VTLs (e.g., some tape drives on the FC port are owned by one VTL, and other tape drives on the same FC port are owned by another VTL), then the transfer rate is divided across all of the VTLs using that FC port.

The monitor component 212 may also determine the maximum storage capacity of each VTL. For purposes of illustration, each virtual cartridge may be held in a "storage pool," where the storage pool may be a collection of disk array logical unit numbers (LUNs). There can be one or multiple storage pools in a single VLS product, and the virtual cartridges in those storage pools can be loaded into any VTL. In addition, the virtual cartridge capacity can be set (e.g. by the user) to be more or less than the actual storage capacity (e.g., that of the physical disk). Accordingly, the monitor component 212 needs to determine the "allocated" capacity when determining the maximum disk capacity of a VTL.

The allocated capacity may be determined as follows. If all of the virtual cartridges in the VTL are held in one or more storage pool dedicated to that particular VTL, then the storage pool capacity is the total usable disk size of the storage pool (s). But a storage pool may also be shared across multiple VTLs, in which case the capacity is divided across the number of VTLs based on virtual cartridge allocation.

If the allocated cartridge capacity is larger than the storage pool capacity then the maximum capacity of the VTL is the storage pool capacity. But if the allocated capacity is smaller than the storage pool capacity then the maximum capacity of the VTL is the allocated cartridge capacity.

The monitor component 212 may also determine the maximum theoretical logical backup size based on the current VTL information. The monitor component 212 may make this determination based on the current free disk space available (e.g., the maximum disk capacity for a VTL minus the used disk capacity for that VTL), multiplied by the current average overall "system ratio" (e.g., the current logical capacity for a VTL divided by used disk capacity for that VTL). The maximum theoretical logical backup size is an estimate of how much more logical backups can be stored in the VTL.

To determine current physical disk usage in a VTL, the monitor component 212 "looks back" over an actual usage time (e.g., the previous 7 days) to find the peak usage of the VTL. Peak usage is used because deduplication includes post-processing, at any given time, the current usage may not be the time of peak usage. In addition, the peak usage should be measured from the largest backup (e.g., a weekly full backup).

To determine current performance in the VTL, the monitor component 212 again "looks back" over the actual usage time (e.g., the previous 7 days) to find the average performance of the VTL during each day of a backup window (e.g., as input by the user). Average performance is used because there may be full or incremental backups on different days with different backup windows.

Based on the above determination, the simulator component 213 can add the estimated performance and logical/physical capacity to handle the new backup job to the actual performance and logical/physical capacity to obtain "simulated" performance and logical/physical capacity for the VLS product. The simulator component 213 compares the "simulated" performance and logical/physical capacity with a "threshold" performance and logical/physical capacity (e.g., based on actual or desired maximum usage and performance) to determine whether the new backup job should be implemented.

It is noted that the threshold performance and logical/physical capacity may be an actual maximum performance and logical/physical capacity for the VLS product. Alternatively, the threshold performance and logical/physical capacity may be based on a desired performance and logical/physical capacity for the VLS product. For example, the user may define one or more thresholds as a percentage of the actual maximum usage and performance. For example the user may not wish to exceed 90% usage and/or performance, thereby leaving spare "headroom" for existing backups to grow over time.

Before continuing, it is noted that backup policies and thresholds, such as described herein, may be based on any of a variety of different factors, such as, but not limited to, storage limitations, corporate policies, or as otherwise determined by the user or recommended by a manufacturer or service provider.

Figure 3:
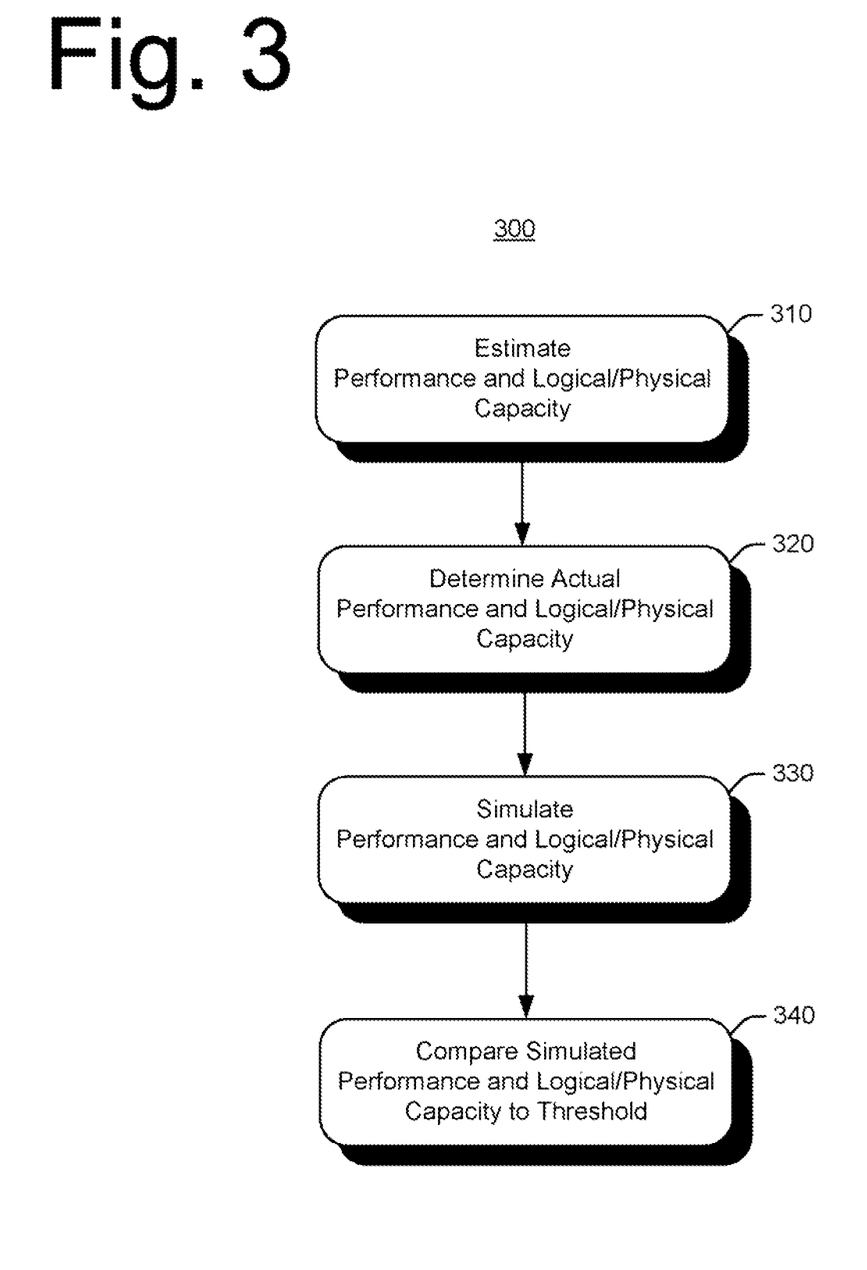
FIG. 3 is a flow diagram illustrating exemplary operations which may be implemented for determining impact of a backup job on virtual storage resources.

FIG. 3 is a flow diagram 300 illustrating exemplary operations which may be implemented for determining impact of a new backup job on virtual storage resources. In operation 310, an estimated performance and logical/physical capacity is determined for a backup job on a virtual library storage (VLS). In operation 320, an actual performance and logical/physical capacity is determined without the backup job.

In operation 330, a simulated performance and logical/physical capacity is determined of the VLS is determined for the new backup job based on the estimated and actual performance and logical/physical capacity. In operation 340, the simulated performance and logical/physical capacity is compared to a threshold.

Other operations (not shown in FIG. 3) may also be implemented in other embodiments. Further operations may include, for example, trend analysis on the current capacity/performance data. In another example, replication between VLS products may also be analyzed. Existing measurements on replication (e.g., throughput for a replication link, throttling, blackout windows, etc.) may be used to determine the current link usage. The user may define the maximum bandwidth and service level (e.g., how long before a backup job is safely replicated mirrored).

It is noted that the exemplary embodiments shown and described are provided for purposes of illustration and are not intended to be limiting. Still other embodiments are also contemplated for determining impact on virtual storage resources.

The invention claimed is:

1. A method of determining impact of a backup job on storage resources, the method executed by a computer storage system and comprising:

receiving parameters for a backup job, wherein the parameters include at least job size, retention policy, backup window, and compression factor;

determining by an estimator component in a virtual library storage system, an estimated performance and an estimated capacity for the backup job;

determining by a monitoring component in the virtual library storage system, an actual performance and an actual capacity of a storage device without the backup job;

determining, by a simulator component in the virtual library storage system, a simulated performance based on adding the estimated performance and the actual performance; and determining by a simulator component in the virtual library storage system, a simulated capacity based on adding the estimated capacity and the actual capacity; and comparing the simulated performance and simulated capacity to a threshold to determine impact of the backup job on storage resources.

2. The method of claim 1, wherein the capacity is logical and/or physical capacity.

3. The method of claim 1, wherein the backup job is enabled if the simulated performance and simulated capacity satisfies the threshold, and wherein the backup job is disabled if the simulated performance and simulated capacity fails the threshold.

4. The method of claim 1, wherein the threshold is less than 100% and based on a maximum performance and maximum capacity of storage for the backup job.

5. The method of claim 1, wherein determining actual performance and actual capacity is by monitoring multiple virtual tape libraries (VTLs), at least one of the multiple VTLs having different characteristics.

6. The method of claim 1, wherein determining actual performance and actual capacity is by monitoring virtual cartridges in a virtual tape library (VTL).

7. The method of claim 6, wherein actual capacity is physical capacity based on a number of dedicated virtual cartridges versus shared virtual cartridges.

8. The method of claim 6, wherein actual capacity is physical capacity based on a number of virtual cartridges in at least one dedicated storage pool versus at least one shared storage pool.

9. The method of claim 1, wherein determining actual performance and actual capacity is by monitoring virtual tape drives in a virtual tape library (VTL).

10. The method of claim 1, wherein determining actual performance and actual capacity is by monitoring fiber channel (FC) ports in a virtual tape library (VTL).

11. The method of claim 1 wherein the storage resources comprise a virtual library storage (VLS).

12. A non-transitory computer-readable medium storing logic executable by a processor to at least: receiving parameters for a backup job;

determine by a simulator component in a virtual library storage system, a simulated performance and simulated capacity, determine by an estimator component in the virtual library storage system, an estimated performance and an estimated capacity of the backup job, and determine by a monitoring component in the virtual library storage system, an actual performance and actual capacity of a storage device for the backup job, wherein the parameters for the backup job include at least job size, retention policy, backup window, and compression factor, wherein estimated performance is amount of data transfer needed to write new replications to the storage device, and wherein actual performance is based on average performance of the storage device during a backup window; and compare the simulated performance and simulated capacity to a threshold to determine impact of the backup job on virtual storage resources.

13. The system of claim 12, wherein the logic is executable to determine the estimated and actual performance and actual capacity for the backup job.

14. The system of claim 12, wherein the backup job is enabled if both the simulated performance and simulated capacity satisfies the threshold, and the backup job is disabled if both the simulated performance and simulated capacity fails the threshold.

15. The system of claim 12, further comprising an interface configured to receive parameters for the backup job, wherein the parameters include at least job size, retention policy, backup window, and compression factor.

16. The system of claim 12, wherein determining actual performance and actual capacity is by monitoring virtual cartridges in multiple virtual tape libraries (VTLs), each of the multiple VTLs having different characteristics.

17. The system of claim 12, wherein actual capacity is physical capacity based on a number of dedicated virtual cartridges versus shared virtual cartridges, and is further based on a number of virtual cartridges in at least one dedicated storage pool versus at least one shared storage pool.

18. The system of claim 12, wherein actual performance and actual capacity is determined by monitoring virtual tape drives in a virtual tape library (VTL), and by monitoring fiber channel (FC) ports in the VTL.

19. The storage system of claim 12 further comprising a virtual library storage (VLS) for the backup job.

20. The storage system of claim 12 wherein the estimated performance takes time variations into consideration.

21. The storage system of claim 12 wherein the estimated capacity is based on retention rate, number of full backups, and daily percentage change.

22. The storage system of claim 12 wherein the estimated capacity takes into consideration post-processing working space.

23. The storage system of claim 12 wherein the simulated performance and simulated capacity is determined by adding estimated performance and estimated capacity to the actual performance and actual capacity, respectively.

* * * * *

UNITED STATES PATENT AND TRADEMARK OFFICE
CERTIFICATE OF CORRECTION

PATENT NO.        : 9,158,653 B2                                              Page 1 of 1
APPLICATION NO.   : 12/728249
DATED             : October 13, 2015
INVENTOR(S)       : Stephen Gold It is certified that error appears in the above-identified patent and that said Letters Patent is hereby corrected as shown below:

In the Claims
In column 8, line 11, in Claim 1, delete "determining," and insert -- determining --, therefor.

Signed and Sealed this
Tenth Day of May, 2016

Michelle K. Lee
*Director of the United States Patent and Trademark Office*